Figure 1:
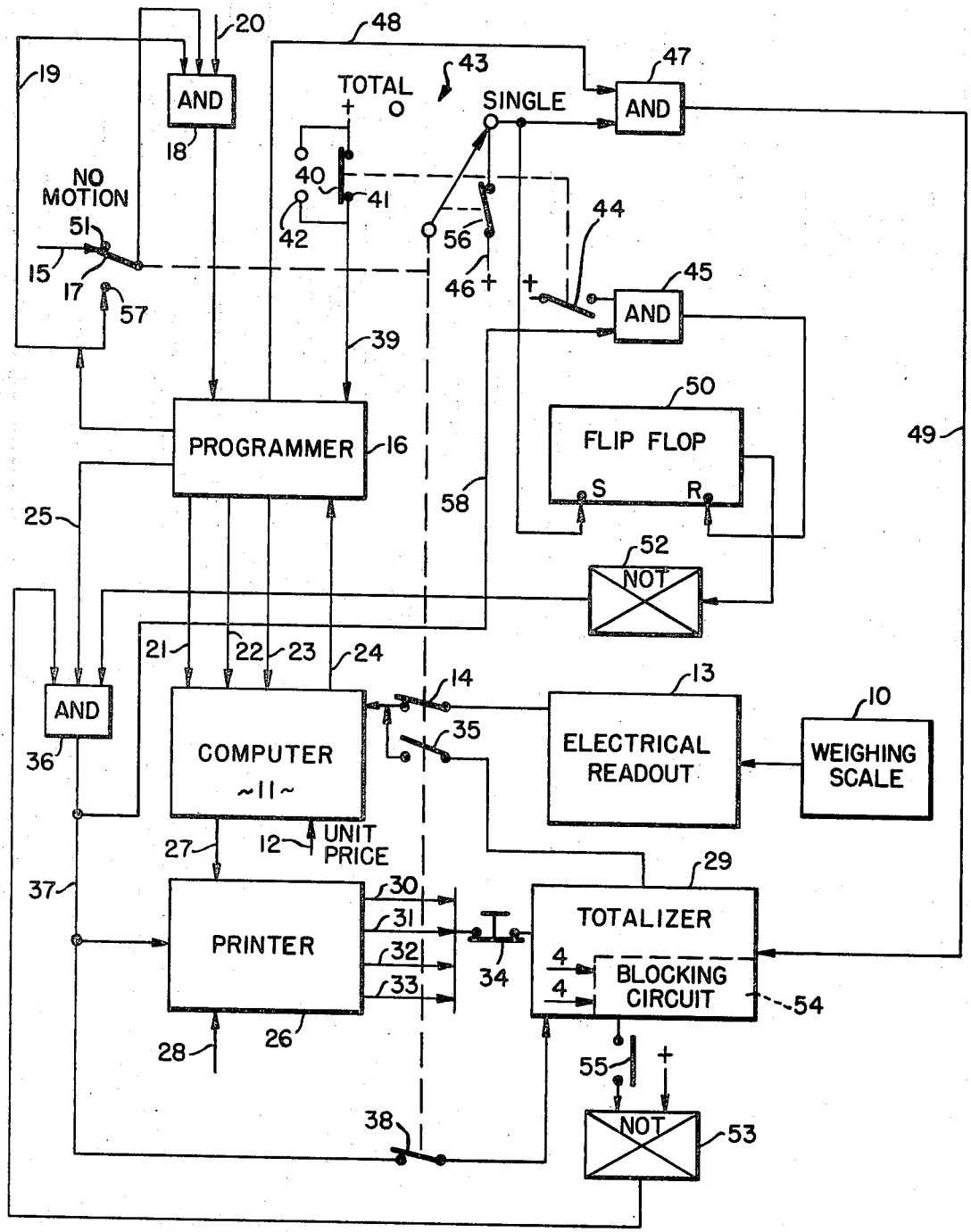

United States Patent

[11] 3,561,551

[72] Inventor William C. Susor
 Toledo, Ohio
[21] Appl. No. 843,940
[22] Filed July 23, 1969
[45] Patented Feb. 9, 1971
[73] Assignee Reliance Electric Company
 Toledo, Ohio
 a corporation of Delaware

[54] COMPUTING AND PRINTING WEIGHING SCALE SYSTEM WITH WEIGHT TOTALIZING MEANS
 8 Claims, 1 Drawing Fig.
[52] U.S. Cl. .................................................. 177/3, 177/17
[51] Int. Cl. .................................................. G01g 23/38
[50] Field of Search .................................................. 177/3—5, 15, 17, (Allen Digest)

[56] References Cited
UNITED STATES PATENTS
3,170,624 2/1965 Allen ........................... 177/3X
3,291,232 12/1966 Bell ........................... 177/17X
3,384,193 5/1968 Susor et al. ........................... 177/3
3,388,758 6/1968 Allen et al. ........................... 177/4
3,453,422 7/1969 Susor ........................... 177/3X Primary Examiner—Richard B. Wilkinson
Assistant Examiner—George H. Miller, Jr.
Attorney—Thomas H. Grafton ABSTRACT: A system for weighing, computing and printing records of the weight and value of each and the total of a plurality of successively weighed loads having retail and wholesale modes of operation. When the system is in the retail mode, tickets are printed showing the weight of a single package, the retail price per pound and value computed by multiplying such single weight and retail price. When the system is in wholesale mode, tickets are printed showing the total weight of a plurality of packages, the wholesale price per pound and value computed by multiplying such total weight and wholesale price.

PATENTED FEB 9 1971   3,561,551

INVENTOR.
WILLIAM C. SUSOR
BY
Thomas H. Grafton
ATTORNEY

COMPUTING AND PRINTING WEIGHING SCALE SYSTEM WITH WEIGHT TOTALIZING MEANS

BACKGROUND OF THE INVENTION

1. Field of the Invention

The invention relates to electronic computing and printing scales.

2. Description of the Prior Art

U.S. Pat. No. 3,384,193 issued May 21, 1968 to W. C. Susor and O. J. Martin discloses a system for weighing, computing and printing a record of the weight and value of each of a plurality of successively weighed loads.

SUMMARY OF THE INVENTION

The system disclosed in the foregoing patent is modified to have retail and wholesale modes of operation. In retail mode, the system operates as disclosed in the patent. In wholesale mode, a totalizer enters the total weight factor of a plurality of loads in the computer and such factor is multiplied by a wholesale price per pound factor to compute wholesale value. When the system is in retail mode, tickets are printed as usual. These can be, for example, weight and pricing labels for packages of meat. After 10 retail tickets, for example, are printed relating to one kind of a commodity in 10 packages, the unit price input to the computer is changed to the wholesale price and the system is placed in wholesale mode. One ticket then is printed showing the total weight of the 10 packages, the total computed value of the 10 packages, and the wholesale unit price. This wholesale ticket accompanies a box containing the 10 packages, which may be sent from a central prepackaging warehouse to a retail store, and is useful in charging the retail store for the wholesale order.

The objects of the invention are to improve load-measuring devices, to provide electronic computing and printing scales with retail and wholesale modes of operation, and to provide operational interlocks and signals for such scales to ensure system reliability.

The above and other objects and features of this invention will be appreciated more fully from the following detailed description when read with reference to the accompanying drawing wherein:

The Figure is a block diagram illustrating the general organization of the weighing, computing and printing system with retail and wholesale mode means and interlocks of the invention combined therewith.

A system for weighing, computing and printing a record of the weight and value of each of a plurality of successively weighed loads is shown in the foregoing U.S. Pat. No. 3,384,193 and in U.S. Pat. No. 3,453,422 issued Jul. 1, 1969 to W. C. Susor.

The system includes a computing weighing scale 10 and a computer 11 which receives weight information from the scale and multiplies the weight of an article upon the scale by the unit price, entered at 12, to compute the value of such article. The computer 11 also multiplies such unit price times one so that it produces an electrical unit price output. The computer has an input which is compatible with the parallel 1–2–4–8 binary coded decimal weight output of an electrical readout 13 in circuit therewith. Electrical connection of the readout 13 to the computer 11 is through contacts 14.

The weighing scale 10 is connected to a motion detector, not shown, which prevents erroneous weight readouts from taking place when the weighing mechanism is in motion. The motion detector applies no motion signals through a lead 15 (lead 29 in the foregoing U.S. Pat. No. 3,384,193) to a programmer 16, the lead 15 being connected to the programmer 16 through contacts 17 and an AND gate 18. The AND gate 18 (AND gate 90 in the above U.S. Pat. No. 3,384,193) is enabled by three inputs, the no motion signal on the lead 15, a ready light signal on a lead 19 from the programmer 16 (ready light 89 in the above U.S. Pat. No. 3,384,193) and a signal on a lead 20 indicating that there is no excess value.

The programmer 16 applies reset signals and command-to-compute signals through leads 21, 22 and 23, respectively, to the computer 11 and receives program advance signals through a lead 24 from the computer. The programmer 16 also applies a print signal through a lead 25 to a mechanical readout and printer 26 commanding it to print. The mechanical readout includes a combination of a series of modules each comprising a detent wheel which is directly gear connected to a commutator and to a print wheel. Each module indicates the digits of a particular denomination. When the turning print wheel approaches the correct indicating position, a stopping latch intercepts the correct one of the teeth of the detent wheel to arrest the detent wheel. Such readout also includes coincidence circuits which receive 1–2–4–8 binary coded unit price signals from the computer 11 through a cable 27 and 1–2–a'–8 binary coded decimal signals through a cable 28 indicative of the positions of the respective commutators. The detend wheels and thus the print wheels are stopped when the coincidence circuits determine that the wheels are in the correct indicating positions. Similarly, the coincidence circuits receive 1–2–4–8 binary coded decimal weight and value signals from the computer 11 through leads not shown and 1–2–a'–8 binary coded decimal signals through leads not shown indicative of the positions of the respective commutators. There are four weight print wheels (maximum weight is 25.00 pounds) set up by four weight contact closures (contacts 46—49 in the above U.S. Pat. No. 3,384,193,). These weight contact closures also are utilized to enter weight into a totalizer 29 through leads 30—33. Push button contacts 34 connect the leads 30—33 to the totalizer 29 and contacts 35 connect the totalizer 29 to the computer 11. The print signal on the lead 25 after passing an AND gate 36 is applied through a lead 37 to the printer 26 and to the totalizer 29. A switch 38 is located in the lead 37 between the printer 26 and the totalizer 29.

The system is readied for weighing by setting the commodity name printing plate in the machine, turning the price setting knobs, setting tare into the system, and closing a reset switch as described in the foregoing U.S. Pat. No. 3,384,193. This applies an input signal to the programmer 16 through a lead 39. Breaking the signal, for example, by removing the printing plate, causes the programmer 16 to reset. In the system shown in FIG. 1, the input signal additionally is broken momentarily whenever contacts 40 are moved from terminals 41 to terminals 42 and vice versa. A retail-wholesale switch 43 having TOTAL and SINGLE terminals is mechanically connected to the contacts 14, 17, 35, 38, 40, 44, and 56. Contacts 44 when closed partially enable an AND gate 45.

In retail mode, i.e., when the switch 43 is in its SINGLE or single package setting, the system operates as disclosed in the above U.S. Pat. No. 3,384,193. The switch 43 applies a signal from a lead 46 through closed contacts 56 to partially enable an AND gate 47 which is enabled when the foregoing reset switch (switch 71 in U.S. Pat. No. 3,384,193) is closed to apply the enabling signal on a lead 48. The output of the AND gate 47 on a lead 49 resets the totalizer 29. In retail mode, the switch 43 also applies a signal from the lead 46 through closed contacts 56 to the S terminal of a flip-flop 50 setting the flip-flop. As shown, contacts 14, 38 and 56 are closed, contacts 35 and 44 are open, contacts 17 engage a terminal 51, and contacts 40 engage terminals 41. As described above, moving contacts 40 from terminals 42 to terminals 41 resets the programmer 16.

In retail mode, the computer 11 receives weight information from the scale through closed contacts 14 and multiplies the weight of an article upon the scale by the unit retail price of such article to compute the value of such article. The weight and computed value print wheels in the printer 26 are setup. The programmer 16 programs such events after receiving the output signal from the AND gate 18 by applying the above reset signals and command-to-compute signals through leads 21, 22 and 23, respectively. Application of the print signal by the programmer 16 to the lead 25 enables the AND gate 36 which had been partially enabled by signals from NOT gates 52 and 53. The print signal is applied to the printer 26 through the lead 37 and through closed contacts 38 to the totalizer 29. NOT gate 52 applies its output to the input of the AND gate 36 because the flip-flop 50 does not apply an input to the NOT gate 52 in its set position and NOT gate 53 applies its output to the input of the AND gate 36 because a blocking circuit 54, a part of the totalizer 29, does not apply an input to the NOT gate 53 (contacts 55 are open during this part of the cycle as hereinafter described). The print signal applied to the printer 26 causes weight and computed value to be printed on the retail label and the print signal applied to the totalizer 29 causes weight simultaneously to be entered into the totalizer 29.

The totalizer 29 is made by modifying a computer 11. The weight input on leads 30—33 is applied to the weight input leads (see FIG. 4 in the above U.S. Pat. No. 3,453,422) and the price input to the modified computer is maintained as a factor of one by hardwiring a one into the computer price input. The command signal to multiply weight times price in FIG. 4 of U.S. Pat. No. 3,453,422 is applied on the lead 34 shown in the patent. The print signal on lead 37 is applied through the closed contact 38 to the totalizer 29 by applying it to the corresponding command-to-multiply lead in the totalizer. Weight times the factor of one is computed and accumulated in the counters of the totalizer 29 every time a print command signal passes through the AND gate 36. In retail mode, there is no reset of the counters in the totalizer 29. The print signal applied to the printer 26 causes weight and computed value to be printed on the retail label and the print signal applied to the totalizer 29 causes weight simultaneously to be entered into the totalizer 29 which accumulates a running total.

In retail mode, a label is printed with retail unit price, weight and retail computed value in the same manner as disclosed in the above U.S. Pat. No. 3,384,193. In addition, simultaneous with printing the label, the weight factors are entered and accumulated in the totalizer 29.

The system may be used in a central prepackaging operation wherein packages of meat are processed for retail foodstores. When a wholesale box is full of packages or contains a desired number of packages containing one kind of a commodity, the mode switch 43 is changed to TOTAL. At this time each package is labeled and the total weight of all the packages in the wholesale box is accumulated in the totalizer 29. The retail unit price signal on the lead 12 is changed to the wholesale unit price. Moving the mode switch 43 to TOTAL reverses the positions of the ganged contacts 14, 17, 35, 38, 40, 44 and 56. Moving contacts 40 from terminals 41 to 42 resets the programmer 16. Moving contacts 17 from the terminal 51 to a terminal 57 makes the system independent of the no motion signal on the lead 15 by applying the ready light signal on the lead 19 to two inputs of the AND gate 18. Opening contacts 14 and closing contacts 35 disconnects the weight readout 13 from the computer 11 and connects the output of the totalizer 29 to the computer 11. Opening contacts 56 and closing contacts 44 removes the input to the set terminal S of the flip-flop 50 and partially enables the AND gate 45 which is enabled by the first print signal passing through the AND gate 36. A lead 58 connects the output of the AND gate 36 to the input of the AND gate 45. The enabled AND gate 45 applies an input to the reset terminal R of the flip-flop 50 which applies an output to the NOT gate 52. The NOT gate 52 in turn ceases to provide an output to the AND gate 36 which can no longer pass print signals. This happens after one wholesale label has been printed, i.e., after one wholesale label has been printed, the print signal passing through the AND gate 36 which caused the print also enables the AND gate 45 resetting the flip-flop 50. This is an interlock which prevents printing more than one wholesale label. Opening contacts 38 disconnects the totalizer from the output of the AND gate 36 so that the wholesale print signal is applied only to the printer 26 (print wholesale label) and to the AND gate 45 (prevent printing more than one wholesale label).

The reset programmer 16 (reset by moving the mode switch 43 to TOTAL) is advanced for automatic operation by operating the foregoing reset switch (switch 71 in the above U.S. Pat. No. 3,384,193), whereupon the ready light signal from the programmer 16 on the lead 19 enables the AND gate 18 and the programmer 16 advances and produces the print signal on the lead 25. The total weight input to the computer 11 from the totalizer 29 is multiplied by the wholesale price on the price input 12 and the wholesale ticket is printed with the total weight and total value of all the packages in the wholesale box. The wholesale ticket accompanies the box to the retail foodstore. The wholesale ticket in addition contains all of the information on the retail labels, such as the commodity name. One of the features is using the old computer and the old printer for two purposes, i.e., retail and wholesale tickets. It is possible to use the old computer and two printers, one for printing retail tickets and one for printing wholesale tickets in situations where it is desirable to physically separate the printing operations. Also, the weight can be entered directly from the electrical readout 13 into the totalizer 29.

In retail mode, if a label is printed but not used, the push button contacts 34 are opened to prevent weight entry into the totalizer 29.

The weight entry from the totalizer 29 to the computer 11 is in 1-2-4-8 binary coded decimal signals. A one and a two in the most significant place makes 39.99 pounds the limit of the computer when filled from the totalizer (limit of weighing scale is 25.00 pounds). To guard against an excess total, the blocking circuit 54 is provided with a preset entry of four and is connected to the output of the most significant counter in the totalizer 29. At coincidence (a four in the most significant weight place—excess total), the blocking circuit 54 closes contacts 55 and lights an error light not shown. Closing of contacts 55 places a signal on the input of the NOT gate 53 which in turn cuts off its signal to the AND gate 36 disenabling it. The closed AND gate 36 prevents passage of the print signal preventing in turn printing of a wholesale ticket. When the mode switch 43 is returned to SINGLE the totalizer 29 is reset and the contacts 55 open (no coincidence).

The computer 11 computes retail values by multiplying weight factors from the electrical readout 13 by retail unit price factors on the input 12 and computes wholesale values by multiplying weight factors from the totalizer 29 by wholesale unit price factors on the input 12. The means for entering the single weight factors in the totalizer 29 are the means shown, i.e., contact closures in the printer 26 place weight signals on leads 30—33, or direct entry of weight factors from the readout 13 into the totalizer 29. The switch 43 has a single package setting SINGLE for connecting the weighing scale readout 13 to and disconnecting the totalizer 29 from the computer 11 (contacts 14 closed and contacts 35 open) and a total setting TOTAL for disconnecting the weighing scale readout from and connecting the totalizer to the computer (contacts 14 open and contacts 35 closed).

The system includes circuit means (AND gate 47) which is conditioned (partially enabled) by changing the mode switch 43 from the total setting to the single package setting for resetting the totalizer. The AND gate 47 is completely enabled by the output on the lead 48 connecting the programmer 16 to the AND gate 47.

The system also includes circuit means (contacts 40) for resetting the programmer 16 automatically after every change in the setting of the mode switch 43.

The system also includes circuit means (contacts 17) which are conditioned by changing the mode switch 43 from the single package setting to the total setting for advancing the programmer 16 independently of the weighing portion of the system, i.e., computing and printing in the SINGLE setting cannot take place until the no motion signal is placed on the lead 15. Printing in the TOTAL setting is independent of the no motion signal.

The system also includes blocking circuit means 54 (an interlock) for preventing printing when the total of the single weight factors in the totalizer 29 reaches a predetermined number. That is, at coincidence (a four in the most significant total weight place), contacts 55 are closed to prevent printing a wholesale ticket.

The system also includes selectively operable switch means (contacts 34) which are provided for preventing entry of the single weight factors into the totalizer 29. This interlock is used when a retail ticket has been printed but for some reason not used.

The system also includes circuit means (AND gate 45 and flip-flop 50) which are conditioned by moving the mode switch 43 from SINGLE to TOTAL for preventing more than one printing operation per TOTAL setting.

It is to be understood that the above description is illustrative of this invention and that various modifications thereof can be utilized without departing from its spirit and scope.

I claim:

1. A system for weighing, computing and printing records of the weight and value of each and the total of a plurality of successively weighed loads comprising, in combination, a computer for computing the values according to weight and price per weight unit factors, weighing scale readout means for entering the single weight factor of each of the loads in the computer, totalizer means for entering the total weight factor of a plurality of loads in the computer, means for entering price per weight unit factors in the computer, printer means for printing said weight factors and/or said computed values, means for entering said single weight factors in the totalizer means, programmer means for programming the system, and switch means having a single package setting for connecting the weighing scale readout means to and disconnecting the totalizer means from the computer and a total setting for disconnecting the weighing scale readout means from and connecting the totalizer means to the computer.

2. A system according to claim 1 wherein circuit means are provided which are conditioned by switching said switch means from the total setting to the single package setting for resetting the totalizer.

3. A system according to claim 1 wherein circuit means are provided for resetting the programmer means automatically after every change in said switch settings.

4. A system according to claim 1 wherein circuit means are provided which are conditioned by switching said switch means from the single package setting to the total setting for advancing the programmer means independently of the weighing portion of the system.

5. A system according to claim 1 wherein the totalizer means includes blocking circuit means for preventing printing when the total of the single weight factors in the totalizer means reaches a predetermined number.

6. A system according to claim 1 wherein selectively operable switch means are provided for preventing entry of the single weight factors into the totalizer means.

7. A system according to claim 1 wherein circuit means are provided which are conditioned by switching said switch means from the single package setting to the total setting for preventing more than one printing operation per total setting.

8. A system according to claim 1 wherein the printer means prints said weight factors and/or said computed values and also enters said single weight factors in the totalizer means.